United States Patent
Hasegawa et al.

(10) Patent No.: US 8,247,118 B2
(45) Date of Patent: *Aug. 21, 2012

(54) NON-AQUEOUS SOLVENT AND NON-AQUEOUS ELECTROLYTIC SOLUTION FOR ENERGY STORAGE DEVICE, AND ENERGY STORAGE DEVICE, LITHIUM SECONDARY BATTERY AND ELECTRIC DOUBLE-LAYER CAPACITOR EACH COMPRISING THE NON-AQUEOUS SOLVENT OR THE NON-AQUEOUS ELECTROLYTIC SOLUTION

(75) Inventors: Masaki Hasegawa, Osaka (JP); Takashi Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/061,345

(22) PCT Filed: Oct. 20, 2009

(86) PCT No.: PCT/JP2009/005493
§ 371 (c)(1),
(2), (4) Date: Feb. 28, 2011

(87) PCT Pub. No.: WO2010/047092
PCT Pub. Date: Apr. 29, 2010

(65) Prior Publication Data
US 2011/0171540 A1    Jul. 14, 2011

(30) Foreign Application Priority Data

Oct. 21, 2008 (JP) .................... 2008-270636

(51) Int. Cl.
*H01M 6/16* (2006.01)
(52) U.S. Cl. ........ 429/336; 429/200; 429/199; 429/330; 429/324; 429/188; 252/62.2; 252/364; 361/502; 570/131
(58) Field of Classification Search .............. 429/336, 429/200, 199, 330, 324, 188; 252/62.2, 364; 361/502; 570/131
See application file for complete search history.

(56) References Cited

U.S. PATENT DOCUMENTS

| | | | |
|---|---|---|---|
| 6,495,293 | B1 | 12/2002 | Arai et al. |
| 2005/0158623 | A1 | 7/2005 | Matsui et al. |
| 2005/0162813 | A1 | 7/2005 | Fujino |
| 2005/0165260 | A1 | 7/2005 | Lal et al. |
| 2009/0297954 | A1 | 12/2009 | Hasegawa et al. |

FOREIGN PATENT DOCUMENTS

| | | |
|---|---|---|
| JP | 2000-223151 | 8/2000 |
| JP | 2000-348762 A | 12/2000 |
| JP | 2001-085058 A | 3/2001 |
| JP | 2001-143749 | 5/2001 |
| JP | 2004-111359 | 4/2004 |
| JP | 2005-149750 | 6/2005 |
| JP | 2005-206600 A | 8/2005 |
| JP | 2005-229103 | 8/2005 |
| JP | 2005-327785 A | 11/2005 |
| JP | 2006-286650 | 10/2006 |
| JP | 2007-224001 A | 9/2007 |
| WO | WO 03/058746 A1 | 7/2003 |

OTHER PUBLICATIONS

International Search Report and Written Opinion issued in International Patent Application No. PCT/JP2009/002197, dated Aug. 11, 2009.

*Primary Examiner* — Laura Weiner
(74) *Attorney, Agent, or Firm* — McDermott Will & Emery LLP

(57) ABSTRACT

A nonaqueous solvent for an electrical storage device according to the present invention includes fluorine-containing cyclic saturated hydrocarbon having a structure represented by the following general formula (1) in which one or two substituents R are introduced into a cyclohexane ring; a compound having a relative dielectric constant of 25 or higher; and a chain carbonate (in general formula (1), R is represented by $C_nX_{2n+1}$ where n is an integer of 1 or greater, at least one of (2n+1) pieces of X's is F, and the other X's are H).

[Chemical formula 4d]

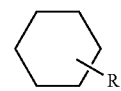

(1)

10 Claims, 4 Drawing Sheets

NON-AQUEOUS SOLVENT AND NON-AQUEOUS ELECTROLYTIC SOLUTION FOR ENERGY STORAGE DEVICE, AND ENERGY STORAGE DEVICE, LITHIUM SECONDARY BATTERY AND ELECTRIC DOUBLE-LAYER CAPACITOR EACH COMPRISING THE NON-AQUEOUS SOLVENT OR THE NON-AQUEOUS ELECTROLYTIC SOLUTION

RELATED APPLICATIONS

This application is the U.S. National Phase under 35 U.S.C. §371 of International Application No. PCT/JP2009/005493, filed on Oct. 20, 2009, which in turn claims the benefit of Japanese Application No. 2008-270636, filed on Oct. 21, 2008, the disclosures of which Applications are incorporated by reference herein.

TECHNICAL FIELD

The present invention relates to a nonaqueous solvent and a nonaqueous electrolytic solution usable for an electrical storage device for storing or accumulating electrochemical energy, and an electrical storage device using the same, such as a lithium secondary battery or an electric double layer capacitor.

BACKGROUND ART

Recently, high voltage electrical storage devices in which a charge voltage and a discharge voltage of a single electrical storage element each exceeds 1.5 V have been progressively developed. As such high voltage electrical storage devices, lithium primary batteries, lithium ion secondary batteries, lithium polymer secondary batteries, electric double layer capacitors and the like have been put into practice.

For a high voltage electrical storage device, a nonaqueous electrolytic solution using an organic compound as a solvent is used. The reason for this is that water, if used as the solvent of the electrolytic solution, is electrolyzed by the high charge voltage and discharge voltage. A nonaqueous electrolytic solution is also used for an electrical storage device including an electrode which contains active lithium reactive with water and uses occlusion or release of lithium.

The nonaqueous electrolytic solution is desired to have a high conductivity and a low viscosity in order to improve the discharge performance of the electrical storage device in which the nonaqueous electrolytic solution is used. When used as a solvent for a secondary battery, an electric double layer capacitor or the like, the nonaqueous electrolytic solution needs to be stable chemically and electrochemically in order not to deteriorate the performance of the electrical storage device as a result of the repetition of charge/discharge cycles.

From these points of view, for example, as a main solvent of the electrolytic solution of a lithium ion secondary battery, a mixed system of a cyclic carbonate (cyclic carbonic acid ester) represented by ethylene carbonate and a chain carbonate (chain carbonic acid ester) represented by ethylmethyl carbonate or dimethyl carbonate is conventionally used. As a main solvent of the electrolytic solution of an electric double layer capacitor, a cyclic carbonate represented by propylene carbonate is preferably used.

The above-described electrical storage devices are widely used as a main power source, a backup power source or an electric circuit power source for mobile communication devices or portable electronic devices. Such mobile and portable devices are recently desired to be more compact and to have higher performance. Thus, the electrical storage devices are required to be further improved in the volumetric energy density.

In order to improve the volumetric energy density, it is necessary to improve the average discharge voltage and the volumetric capacitance density. As one measure for realizing this, it is proposed to increase the charge voltage.

In the case of a lithium ion secondary battery, the utilization factor of lithium as a positive electrode material can be improved by raising the charge voltage. As a result, the volumetric capacitance density is increased. As the positive electrode material, a lithium-containing transition metal oxide such as lithium cobalt oxide, lithium nickel oxide or the like is generally used. In the case of an electric double layer capacitor, the value of the electric double layer capacitance can be increased by raising the charge voltage. As a result, the volumetric capacitance density can be increased.

However, in the case where one of a pair of electrodes is charged to a level equal to or higher than 4.3V on the basis of the dissolution/deposition potential of lithium, the following occurs. Even when a conventional chain carbonate or cyclic carbonate which is known to be superb in oxidation resistance and so usable as a nonaqueous solvent suitable to a high voltage electrical storage device is used, such a carbonate is oxidized and decomposed to generate gas. Such a decomposition reaction conspicuously proceeds especially in a high temperature state and is accompanied by generation of a large amount of gas. Therefore, for example, where an internal-pressure-sensitive current interrupt device (CID) for blocking the charging current against excessive charge of a battery is mounted on a high voltage lithium ion secondary battery containing such a nonaqueous solvent, the CID may malfunction to cause the lithium ion secondary battery to lose the function as a battery. In the case where the CID is not mounted, a problem arises that when the amount of gas generation is excessive, the battery is swelled.

Patent Document 1 discloses a nonaqueous electrolytic secondary battery using a nonaqueous electrolytic solution containing cyclic sulfonic acid ester in order to suppress the chain carbonate or the cyclic carbonate from being oxidized and decomposed at a super high potential. In such a nonaqueous electrolytic secondary battery, when the positive electrode is charged to a potential equal to or higher than 4.5V, the cyclic sulfonic acid ester is oxidized and decomposed on the positive electrode side, and a surface of the positive electrode is covered with a film. This film suppresses the solvent from being decomposed on the surface of the positive electrode.

Patent Documents 2 and 3 propose incorporating, into a nonaqueous solvent, a "hydrocarbon compound which may contain a fluorine atom" at 0.01% by volume or greater and 5% by volume or less. These patent documents describe that because a hydrocarbon compound which is stable against oxidation and reduction is present at an activation point on the surface of the electrode, sub reaction of the electrolytic solution component and the electrode active material can be suppressed in a high temperature state.

CITATION LIST

Patent Literature

Patent Document 1: Japanese Laid-Open Patent Publication No. 2005-149750
Patent Document 2: Japanese Laid-Open Patent Publication No. 2004-111359

Patent Document 3: Japanese Laid-Open Patent Publication No. 2006-286650

SUMMARY OF INVENTION

Technical Problem

The nonaqueous electrolytic secondary battery disclosed in Patent Document 1 suppresses the decomposition reaction of the chain carbonate or the cyclic carbonate, but the effect thereof is not sufficient. In addition, because the film is formed on the surface of the positive electrode, the charge transfer resistance is increased on the interface of the positive electrode active material. This causes problems of raising the internal resistance of the battery and also reducing the high-rate discharge performance.

Patent Documents 2 and 3 describe that the nonaqueous electrolytic secondary battery disclosed in these patent publications can suppress the sub reaction of the electrolytic solution component and the electrode active material in a high temperature state owing to a "hydrocarbon compound which may contain a fluorine atom". However, the content of the hydrocarbon compound is as low as 5% by volume or less. In addition, the hydrocarbon compound does not have a property of, for example, adsorbing to, or coordinating at, the surface of the positive electrode. Therefore, the hydrocarbon compound does not selectively exist at a high concentration on the surface of the positive electrode. For these reasons, the nonaqueous electrolytic secondary batteries described in Patent Documents 2 and 3 are not considered to provide the effect of sufficiently suppressing the sub reaction.

The present invention, in light of these problems of conventional art, has an object of providing a nonaqueous solvent and a nonaqueous electrolytic solution for an electrical storage device which are superb in the oxidation resistance. The present invention also has an object of providing a nonaqueous solvent and a nonaqueous electrolytic solution for an electrical storage device which do not generate much gas even if being decomposed. The present invention has an object of providing an electrical storage device having a high charge/discharge characteristic even when being charged at a high voltage and has a high reliability for a long time in a high temperature state, by using such a nonaqueous solvent and such a nonaqueous electrolytic solution for an electrical storage device.

Means for Solving the Problems

A nonaqueous solvent for an electrical storage device according to the present invention includes fluorine-containing cyclic saturated hydrocarbon having a structure represented by the following general formula (1) in which one or two substituents R are introduced into a cyclohexane ring; a compound having a relative dielectric constant of 25 or higher; and a chain carbonate (in general formula (1), R is represented by $C_nX_{2n+1}$ where n is an integer of 1 or greater, at least one of (2n+1) pieces of X's is F, and the other X's are H).

[Chemical formula 1]

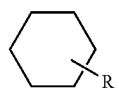

(1)

In a preferable embodiment, n is 1 or 2.

In a preferable embodiment, the fluorine-containing cyclic saturated hydrocarbon is trifluoromethylcyclohexane.

In a preferable embodiment, the fluorine-containing cyclic saturated hydrocarbon is 1,2-bis(trifluoromethyl)cyclohexane.

In a preferable embodiment, the fluorine-containing cyclic saturated hydrocarbon is (2-fluoroethyl)cyclohexane.

In a preferable embodiment, the aqueous solvent for an electrical storage device includes the chain carbonate or a cyclic sulfone.

In a preferable embodiment, the compound having a relative dielectric constant of 25 or higher is a cyclic carbonate.

A nonaqueous electrolytic solution for an electrical storage device according to the present invention includes the nonaqueous solvent for an electrical storage device defined by any one of the above; and a support electrolyte salt.

In a preferable embodiment, the support electrolyte salt is a lithium salt.

In a preferable embodiment, the support electrolyte salt is a quaternary ammonium salt.

An electrical storage device according to the present invention includes the nonaqueous solvent for an electrical storage device defined by any one of the above.

A lithium ion secondary battery according to the present invention includes the nonaqueous electrolytic solution for an electrical storage device defined by any one of the above.

An electric double layer capacitor according to the present invention includes the nonaqueous electrolytic solution for an electrical storage device defined by any one of the above.

Effects of the Invention

Owing to containing fluorine-containing cyclic saturated hydrocarbon, a nonaqueous solvent and a nonaqueous electrolytic solution for an electrical storage device according to the present invention have a high oxidation resistance and do not generate gas almost at all even when the nonaqueous solvent is oxidized and decomposed. Owing to containing a chain carbonate, a nonaqueous solvent and a nonaqueous electrolytic solution for an electrical storage device according to the present invention can dissolve a support electrolyte salt at a higher concentration than those only containing a fluorine-containing cyclic saturated hydrocarbon compound and a compound having a relative dielectric constant of 25 or higher. The chain carbonate prevents the separation of the compound having a relative dielectric constant of 25 or higher and fluorine-containing cyclic saturated hydrocarbon from each other, and improves the compatibility thereof.

Accordingly, a nonaqueous solvent and a nonaqueous electrolytic solution for an electrical storage device according to the present invention has a superb oxidation resistance under a high voltage and also has a high ion conductivity. An electrical storage device according to the present invention, such as a lithium ion secondary battery or an electric double layer capacitor has a high charge/discharge characteristic even when being charged at a high voltage and also a high reliability for a long time in a high temperature state.

DESCRIPTION OF EMBODIMENTS

Figure 1:
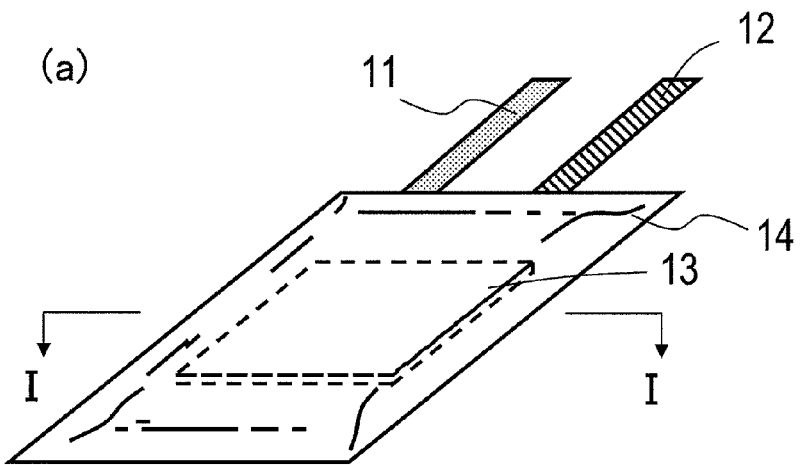
FIG. 1 (a) is an isometric view showing a lithium ion secondary battery in an embodiment according to the present invention; (b) is a cross-sectional view taken along line I-I in FIG. 1(a); and (c) shows a cross-sectional view of an electrode unit 13 shown in FIGS. 1(a) and (b) in enlargement.
Figure 1:
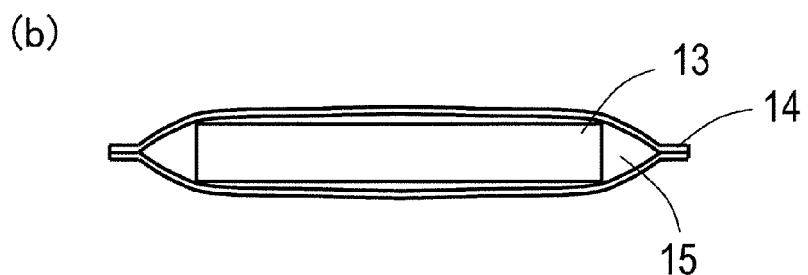
Figure 1:
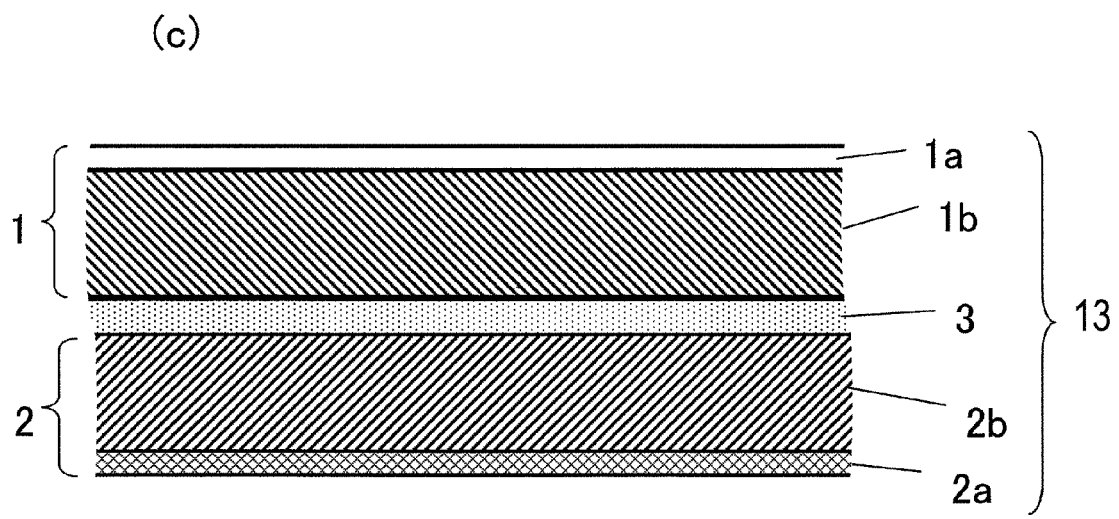

As a nonaqueous solvent for an electrical storage device, which is superb in the oxidation resistance and does not generate much gas even if being decomposed, the present inventors proposed a nonaqueous solvent containing fluorine-containing cyclic saturated hydrocarbon having a cyclohexane ring and a compound having a relative dielectric constant of or higher in non-published Japanese Patent Application No. 2008-131174. An electrical storage device using this nonaqueous solvent as an electrolytic solution suppresses the decomposition of the nonaqueous solvent even when being charged/discharged at a voltage of 4.3 V or higher, and also suppresses the generation of gas.

However, as a result of detailed examination by the present inventors, it was found that the following might occasionally occur depending on the type of the used support electrolyte salt in the case where this nonaqueous solvent is used: the solubility of the support electrolyte salt in the nonaqueous solvent is insufficient; or when the support electrolyte salt is dissolved, the compatibility of the fluorine-containing cyclic saturated hydrocarbon and the compound having a relative dielectric constant of 25 or higher is lowered. For example, $LiPF_6$, which is widely known in general as a support electrolyte salt, is uniformly dissolved in this nonaqueous solvent only at a low concentration of 0.5 mol/L or lower. Therefore, depending on the type of the support electrolyte salt used, the ion conductivity of the electrolytic solution may be lowered and so a sufficiently high charge/discharge characteristic may not be obtained.

As a result of examining various nonaqueous solvents in consideration of these points, the present inventors achieved the present invention. Hereinafter, embodiments of the present invention will be described in detail.

Embodiment 1

A Nonaqueous Solvent for an Electrical Storage device in an embodiment according to the present invention will be described. The nonaqueous solvent in this embodiment is used for an electrical storage device such as a lithium ion secondary battery, an electric double layer capacitor or the like.

A nonaqueous solvent contained in an electrolytic solution for an electrical storage device is required to have (1) a function of dissociating a support electrolyte salt, (2) a function of diffusing ions generated by the dissociation of the salt, and (3) a sufficiently high oxidation resistance to prevent the solvent from being oxidized or decomposed at the voltage at the time of charge/discharge.

Cyclic carbonates represented by ethylene carbonate generally have a high relative dielectric constant and also a high oxidation resistance, namely, have the features of (1) and (3). However, cyclic carbonates occasionally do not fully provide the function of (2) due to a high viscosity thereof. Therefore, a nonaqueous solvent having the functions of (1), (2) and (3) has been conventionally realized by adding a chain carbonate having a low viscosity such as ethylmethyl carbonate to a cyclic carbonate.

However, when the charge voltage is 4.3 V or higher, the chain carbonate and the cyclic carbonate are oxidized and decomposed. By the decomposition, carbon dioxide is generated. These are considered to cause the above-described problems of the conventional nonaqueous solvents. In consideration of these points, the present inventors invented a nonaqueous solvent containing a plurality of compounds.

A nonaqueous solvent for an electrical storage device in this embodiment includes fluorine-containing cyclic saturated hydrocarbon represented by the following general formula (1), a compound having a relative dielectric constant of 25 or higher, and a chain carbonate.

[Chemical formula 2]

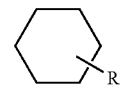

(1)

The fluorine-containing cyclic saturated hydrocarbon represented by general formula (1) has a structure in which one or two hydrogen atoms of cyclohexane are substituted with a substituent R. The substituent R is represented by $C_nX_{2n+1}$ where n is an integer of 1 or greater, at least one of (2n+1) pieces of X's is F, and the other X's are H. Namely, the substituent R is a chain saturated hydrocarbon group in which at least one hydrogen atom (H) is substituted with fluorine (F).

The fluorine-containing cyclic saturated hydrocarbon represented by general formula (1) has an oxidation/reduction potential which is higher than that of a cyclic carbonate or a chain carbonate, specifically, an oxidation/reduction potential equal to or greater than 4.3V. This improves the oxidation resistance of the nonaqueous solvent for an electrical storage device. The fluorine-containing cyclic saturated hydrocarbon represented by general formula (1) does not generate $CO_2$ even if being decomposed.

In general, saturated hydrocarbon has a high oxidation resistance. However, due to its properties of having a low dielectric constant and a low compatibility with a polar solvent, saturated hydrocarbon has been conventionally considered to be difficult to be used as a nonaqueous solvent for an electrical storage device. Therefore, as described in Patent Documents 2 and 3, saturated hydrocarbon is conventionally proposed to be used merely in a limited manner, e.g., to be contained in the solvent in a small amount equal to or less than 5% by volume.

However, as described in detail in the following examples, the present inventors found that cyclohexane having, as a substituent, a hydrocarbon group in which hydrogen is substituted with fluorine has a low molecule symmetry, a superb compatibility with a polar solvent owing to having a dipole moment equal to or greater than 1.6 debye, and a superb oxidation resistance owing to having a cyclic saturated hydrocarbon structure.

The fluorine-containing cyclic saturated hydrocarbon represented by general formula (1) does not have any functional group poor in oxidation stability in a molecule thereof, and so is superb in the oxidation stability. In addition, a fluorine atom bonded to the substituent R has a strong electron absorbing effect, and so the oxidation resistance of the cyclic saturated hydrocarbon can be improved as compared to that of cyclic saturated hydrocarbon without hydrogen being substituted with fluorine. The cyclic saturated hydrocarbon is preferably cyclohexane because cyclohexane is liquid in a temperature range in which the electrical storage device is used and cyclohexane is easily available and easy to handle.

As compared to a compound in which a fluorine atom is directly bonded to a cyclohexane ring, such as 1,1,2,2,3,3,4-heptafluorocyclohexane, a compound represented by general formula (1) in which fluorine is bonded to the substituent R has a lower molecule symmetry. Therefore, the compound represented by general formula (1) has a relatively large polarity and dielectric constant. For these reasons, the fluorine-containing cyclic saturated hydrocarbon represented by general formula (1) is superb in the compatibility with a polar solvent.

As the number of fluorine atoms bonded to the substituent R is larger, the substituent R absorbs more electrons from the cyclohexane ring, and so the oxidation resistance of the cyclohexane ring is more improved. Accordingly, it is more preferable that the substituent R is a trifluoromethyl group or a pentafluoroethyl group.

The number of the substituents R is preferably one or two. In the case where there are two substituents R, there is no specific limitation on the position of the cyclohexane ring to which each substituent R is to be introduced. For decreasing the melting point, it is preferable that the hydrocarbon has a molecular structure in which a carbon atom bonded to one substituent R, or a carbon atom adjacent to the carbon atom bonded to one substituent R, is bonded to the other substituent R. It is more preferable that the hydrocarbon has a molecular structure in which the two substituents R are bonded to one carbon atom.

In the case where there are two substituents R, the two substituents R may have the same structure as each other or have different structures from each other. In the case where there are more than two substituents R, the molecular weight is large and so the diffusion rate of molecules is decreased. Where the substituents R are excessively large, the molecular weight is excessively large, which decreases the diffusion rate of molecules. For these reasons, the carbon number (n) of R is preferably 1 or 2.

The "compound having a relative dielectric constant of 25 or higher" described below generally has a high viscosity and a low function of diffusing ions. By contrast, the fluorine-containing cyclic saturated hydrocarbon represented by general formula (1) has a low viscosity. Therefore, the fluorine-containing cyclic saturated hydrocarbon represented by general formula (1) also has a function of diffusing ions.

Specific compounds of the fluorine-containing cyclic saturated hydrocarbon represented by general formula (1) include, for example, fluoromethylcyclohexane, difluoromethylcyclohexane, trifluoromethylcyclohexane, (2-fluoroethyl)cyclohexane, (2,2-difluoroethyl)cyclohexane, (2,2,2-trifluoroethyl)cyclohexane, (1-fluoroethyl)cyclohexane, (1,2-difluoroethyl)cyclohexane, (1,2,2-trifluoroethyl) cyclohexane, (1,2,2,2-tetrafluoroethyl)cyclohexane, (1,1-difluoroethyl)cyclohexane, (1,1,2-trifluoroethyl) cyclohexane, (1,1,2,2-tetrafluoroethyl)cyclohexane, (pentafluoroethyl)cyclohexane, 1,1-bis(trifluoromethyl)cyclohexane, 1,2-bis(trifluoromethyl)cyclohexane, 1,3-bis(trifluoromethyl)cyclohexane, 1,4-bis(trifluoromethyl)cyclohexane, 1,1-bis(pentafluoroethyl)cyclohexane, 1,2-bis(pentafluoroethyl)cyclohexane, 1,3-bis(pentafluoroethyl)cyclohexane, 1,4-bis(pentafluoroethyl)cyclohexane, 1-(pentafluoroethyl)-1-(trifluoroethyl)cyclohexane and the like.

Among these substances, it is especially preferable to use, as the fluorine-containing cyclic saturated hydrocarbon, trifluoromethylcyclohexane, (pentafluoroethyl)cyclohexane, 1,1-bis(trifluoromethyl)cyclohexane, 1,1-bis(pentafluoroethyl)cyclohexane, 1,2-bis(trifluoromethyl)cyclohexane, 1,3-bis(trifluoromethyl)cyclohexane, or 1-(pentafluoroethyl)-1-(trifluoromethyl)cyclohexane, owing to a superb oxidation resistance thereof. These compounds can be synthesized by fluoriding corresponding alkylcyclohexane or alkylcyclohexane having a leaving group (I, Cl, OH, etc.) at a site to which a fluorine atom is to be introduced, by means of a fluoriding method using $F_2$, $NF_3$ or DAST ((diethylamino)sulfur trifluoride).

The "compound having a relative dielectric constant of 25 or higher" refers to a compound having a relative dielectric constant value of 25 or higher in the temperature range of 25° C. to 40° C. In general, a solvent having a relative dielectric constant of 25 or higher has a polarity sufficient to dissociate the support electrolyte salt and so is suitable to the nonaqueous electrolytic solution for an electrical storage device. In the nonaqueous solvent for an electrical storage device in this embodiment also, the compound having a relative dielectric constant of 25 or higher provides the nonaqueous solvent for an electrical storage device with a function of dissociating the support electrolyte salt.

Examples of such a compound include cyclic carbonates such as ethylene carbonate, propylene carbonate, butylene carbonate and the like; cyclic sulfones such as sulfolane, methyl sulfolane and the like; gamma-butyrolactone; and the like. Table 1 shows the relative dielectric constants of these compounds in the range from 25° C. to 40° C. It is especially preferable to use a cyclic carbonate or a cyclic sulfone because of a high relative dielectric constant thereof.

A fluoride of any of these compounds, for example, fluoroethylene carbonate, fluoropropylene carbonate or the like is also usable. One selected from these compounds, or a mixture of two or more thereof, may be used.

TABLE 1

| Compound | Relative dielectric constant (25 (C.) |
|---|---|
| Ethylene carbonate | 90 (40° C.) |
| Propylene carbonate | 65 |
| Butylene carbonate | 53 |
| Gamma-butyrolactone | 39 |
| Sulfolane | 43 (30° C.) |
| 3-methyl sulfolane | 29 |

A chain carbonate mainly dissociates a support electrolyte salt, and also provides the nonaqueous solvent for an electrical storage device with a function of diffusing generated ions because of a lower viscosity than that of the "compound having a relative dielectric constant of 25 or higher".

It is preferable to use, as the chain carbonate, dimethyl carbonate, ethylmethyl carbonate, diethyl carbonate, methylpropyl carbonate, methylisopropyl carbonate, dipropyl carbonate, dibutyl carbonate, or the like. A fluoride of such a chain carbonate may be used. One of these chain carbonates, or a mixture of two or more thereof, may be used.

Table 2 shows the relative dielectric constants of these chain carbonates. As understood from Table 2, the relative dielectric constants of these carbonates are not very high. However, the support electrolyte salt is separated by the carbonate group of a chain carbonate and thus is solvated, so that the support electrolyte salt can be stably dissolved in a nonaqueous solvent. It is especially preferable to use a chain carbonate having a total carbon number of 9 or less. The reason for this is that a chain carbonate having a total carbon number of 10 or greater has the diffusion rate of molecules decreased because of an increased molecular weight, and also has the function of diffusing generated ions lowered.

TABLE 2

| Compound | Relative dielectric constant (25° C.) |
|---|---|
| Dimethyl carbonate | 3.1 |
| Ethylmethyl carbonate | 3.0 |
| Diethyl carbonate | 2.8 |
| Methylpropyl carbonate | 2.9 |
| Methylisopropyl carbonate | 2.8 |
| Dipropyl carbonate | 2.7 |
| Dibutyl carbonate | 2.6 |

A compound having a relative dielectric constant of or higher and a fluorine-containing cyclic saturated hydrocarbon represented by general formula (1) have a high compatibility. Therefore, the fluorine-containing cyclic saturated hydrocarbon can be mixed at a high concentration. By incorporating a large amount of the fluorine-containing cyclic saturated hydrocarbon having a high oxidation resistance into the nonaqueous solvent, the oxidation resistance of the entire nonaqueous solvent can be increased. Owing to this, an electrical storage device using such a nonaqueous solvent as an electrolytic solution suppresses the decomposition of the nonaqueous solvent even when being charged/discharged at a voltage of 4.3 V or higher, and also suppresses the generation of gas.

By adding a chain carbonate to the nonaqueous solvent, the separation of the compound having a relative dielectric constant of 25 or higher and the fluorine-containing cyclic saturated hydrocarbon can be prevented, and the compatibility thereof can be more increased. The solubility of the support electrolyte salt can also be improved. Accordingly, the nonaqueous solvent for an electrical storage device in this embodiment is superb in the oxidation resistance and the ion conductivity.

In order to exhibit these two features effectively, it is preferable that the fluorine-containing cyclic saturated hydrocarbon compound, the compound having a relative dielectric constant of 25 or higher, and the chain carbonate which form the nonaqueous solvent are contained in the nonaqueous solvent at a prescribed ratio. Specifically, in order to exhibit the superb oxidation resistance, the fluorine-containing cyclic saturated hydrocarbon compound represented by general formula (1) is contained in the nonaqueous solvent at a content of 5% by volume or greater. When the content of the fluorine-containing cyclic saturated hydrocarbon compound in the nonaqueous solvent is 50% by volume or less and the nonaqueous solvent contains a chain carbonate, the compound having a relative dielectric constant of 25 or higher and the fluorine-containing cyclic saturated hydrocarbon compound are mutually dissolved without being separated from each other.

Therefore, it is preferable that the fluorine-containing cyclic saturated hydrocarbon compound is contained in the nonaqueous solvent at a content of 5% by volume or greater and 50% by volume or less. More preferably, the content of the fluorine-containing cyclic saturated hydrocarbon compound is 10% by volume or greater and 30% by volume or less.

In order to dissolve and dissociate a support electrolyte salt such as a lithium salt, a quaternary ammonium salt or the like at a high concentration as described above, it is preferable that the chain carbonate is contained in the nonaqueous solvent at a content of 15% by volume or greater and 70% by volume or less. Owing to this, the support electrolyte salt can be dissolved in the nonaqueous solvent at a high concentration, and so a high ion conductivity is obtained. This also provides an effect of further improving the ion conductivity by lowering the viscosity of the nonaqueous solvent.

As described above, a nonaqueous solvent for an electrical storage device in this embodiment has a high oxidation resistance owing to the fluorine-containing cyclic saturated hydrocarbon contained therein. Therefore, the nonaqueous solvent in this embodiment is suitable for a device having a high charge/discharge voltage exceeding 4.3V (super-high withstand voltage nonaqueous electrical storage device), especially, an electrical storage device such as a lithium ion secondary battery or an electric double layer capacitor. Even in the case where such an electrical storage device is operated at a high voltage, is kept at a high temperature, is subjected to repeated charge/discharge cycles for a long time, etc., the nonaqueous solvent for an electrical storage device in this embodiment is not deteriorated almost at all by oxidation, and so the high-rate charge/discharge characteristic thereof is not spoiled.

Fluorine-containing cyclic saturated hydrocarbon does not have a carbonate group, and so does not generate carbon dioxide even if being decomposed by oxidation. Therefore, the electrical storage device using the nonaqueous solvent for an electrical storage device in this embodiment can avoid the problems that a safety mechanism (CID) is actuated, which would otherwise be caused by the oxidation and decomposition of the solvent, and that the battery is expanded.

The nonaqueous solvent for an electrical storage device in this embodiment contains a chain carbonate, and so can dissolve the support electrolyte salt at a higher concentration than in the case where the nonaqueous solvent contains only a fluorine-containing cyclic saturated hydrocarbon compound and a compound having a relative dielectric constant of 25 or higher. Specifically, in the case where the nonaqueous solvent for an electrical storage device contains only a fluorine-containing cyclic saturated hydrocarbon compound and a compound having a relative dielectric constant of 25 or higher, the support electrolyte salt can be dissolved in the nonaqueous solvent only at a concentration of 0.5 ml/L or less. By contrast, the nonaqueous solvent for an electrical storage device in this embodiment can dissolve the support electrolyte salt at a concentration of about 1 mol/L, like a general solvent used as an electrolytic solution of an electrical storage device. Accordingly, the nonaqueous solvent for an electrical storage device in this embodiment has a sufficiently high ion conductivity as an electrolytic solution of an electrical storage device. Use of the nonaqueous solvent for an electrical storage device in this embodiment realizes an electrical storage device having a high-rate charge/discharge characteristic.

Embodiment 2

Hereinafter, an electrolytic solution for an electrical storage device in an embodiment according to the present invention will be described. The electrolytic solution in this embodiment is usable for an electrical storage device such as a lithium ion secondary battery, an electric double layer capacitor, or the like.

The electrolytic solution for an electrical storage device in this embodiment includes a nonaqueous solvent and a support electrolyte salt.

The nonaqueous solvent is the nonaqueous solvent for electricity storage described in Embodiment 1, and includes a fluorine-containing cyclic saturated hydrocarbon, a compound having a relative dielectric constant of 25 or higher, and a chain carbonate. The nonaqueous solvent is already described in detail and will not be described here.

As the support electrolyte salt, any of generally used support electrolyte salts can be used with no specific limitation in accordance with the type of the electrical storage device. The amount of the support electrolyte salt is adjustable in accordance with the usage thereof. The support electrolyte salt can be dissolved in the nonaqueous solvent at a concentration of up to about 1 mol/L.

Examples of the support electrolyte salt usable in the case where the electrolytic solution in this embodiment is used for a lithium ion secondary battery include lithium salts such as $LiPF_6$, $LiBF_4$, $LiAsF_6$, $LiClO_4$, $LiCF_3SO_3$, $LiSbF_6$, LiSCN, LiCl, $LiC_6H_5SO_3$, $LiN(CF_3SO_2)_2$, $LiC(CF_3SO_2)_3$, $C_4F_9SO_3Li$ and the like; and mixtures thereof.

Examples of the support electrolyte salt usable in the case where the electrolytic solution in this embodiment is used for an electric double layer capacitor include, in addition to the lithium salts mentioned above, quaternary ammonium salts such as $(C_2H_5)_4NBF_4$, $(C_4H_9)_4NBF_4$, $(C_2H_5)_3CH_3NBF_4$, $(C_2H_5)_4NPF_6$, $(C_2H_5)_3CH_3N\text{—}N(SO_2CF_3)_2$, $(C_2H_5)_4N\text{—}N(SO_2CF_3)_2$, and the like; and mixtures thereof.

Owing to containing a compound having a relative dielectric constant of 25 or higher and a chain carbonate, the electrolytic solution in this embodiment can dissolve and dissociate the support electrolyte salt at a sufficiently high concentration even if containing fluorine-containing cyclic saturated hydrocarbon. Therefore, the electrolytic solution in this embodiment has a high oxidation resistance and a high ion conductivity. Use of the electrolytic solution in this embodiment can realize an electrical storage device which can be charged at a high voltage exceeding 4.3V while having a superb high-rate charge/discharge characteristic.

Embodiment 3

Hereinafter, an electrical storage device in an embodiment according to the present invention will be described. The electrical storage device in this embodiment is a lithium ion secondary battery. FIG. 1(a) is an isometric view of a lithium ion secondary battery in this embodiment, and FIG. 1(b) is a cross-sectional view along line I-I in FIG. 1(a).

As shown in FIGS. 1(a) and (b), the lithium ion secondary battery in this embodiment includes an electrode unit 13, a battery case 14 for accommodating the electrode unit 13, and a nonaqueous electrolytic solution 15 filling the battery case 14. A positive electrode in the electrode unit 13 is connected to a positive electrode lead 11, and a negative electrode in the electrode unit is connected to a negative electrode lead 12. The positive electrode lead 11 and the negative electrode lead 12 are extended outside the battery case 14.

As the nonaqueous electrolytic solution 15, any nonaqueous electrolytic solution described in Embodiment 2 which is usable for a lithium ion secondary battery is used. For example, a nonaqueous solvent containing ethylene carbonate (EC) (commercially available battery grade), ethylmethyl carbonate (EMC) (commercially available battery grade), and trifluoromethylcyclohexane (TFMCH) mixed at a ratio of 41:45:14 is usable as the nonaqueous electrolytic solution 15. Ethylene carbonate is a compound having a relative dielectric constant of 25 or higher, ethylmethyl carbonate is a chain carbonate, and trifluoromethylcyclohexane is fluorine-containing cyclic saturated hydrocarbon. In this nonaqueous solvent, $LiPF_6$ (commercially available battery grade) is dissolved as the support electrolyte salt at a concentration of 1 mol/L. In this embodiment, the above combination of nonaqueous solvent and support electrolyte salt is used as an example of the electrolytic solution 15, but other combinations usable for a lithium ion secondary battery among the electrolytic solutions in Embodiment 2 are also usable.

FIG. 1(c) shows a cross-sectional view of the electrode unit 13 in enlargement. As shown in FIG. 1(c), the electrode unit 13 includes a positive electrode 1, a negative electrode 2 and a separator 3 provided between the positive electrode 1 and the negative electrode 2. The positive electrode 1 includes a positive electrode current collector 1a formed of aluminum foil and a positive electrode active material layer 1b formed of $LiCoO_2$ applied on a surface of the positive electrode current collector 1a. The negative electrode 2 includes a negative electrode current collector 2a formed of stainless steel (SUS304) mesh and metal lithium 2b pressure-contacted on a surface of the negative electrode current collector 2a. The separator 3 is formed of, for example, a polyethylene microporous sheet.

A material of the positive electrode active material layer 1b may be a lithium-containing transition metal oxide other than $LiCoO_2$. Examples of the usable material include $Li_xCoO_2$, $Li_xNiO_2$, $Li_xMnO_2$, $Li_xCO_yNi_{1-y}O_2$, $Li_xCO_yM_{1-y}O_z$, $Li_xNi_{1-y}M_yO_z$, $Li_xMn_2O_4$, and $Li_xMn_{2-y}M_yO_4$ (M=at least one of Na, Mg, Sc, Y, Mn, Fe, Co, Ni, Cu, Zn, Al, Cr, Pb, Sb, and B; x=0 to 1.2; y=0 to 0.9; z=1.7 to 2.3). Any other material which makes the potential of the positive electrode 1 at the time of charge exceed 4 V on the lithium basis is usable. A plurality of different materials may be mixed as the positive electrode active material. In the case where the positive electrode active material is powdery, the average particle diameter is not specifically limited but is especially preferably 0.1 to 30 The positive electrode active material layer 1b usually has a thickness of about 50 μm to 200 μm, but is not specifically limited regarding the thickness. The positive electrode active material layer 1b may have a thickness of 0.1 μm to 50 μm.

The positive electrode active material layer 1b may contain both of, or either one of, a conductor and a binder other than the active material. The positive electrode active material layer 1b may contain neither a conductor nor a binder and may be formed only of an active material.

The conductor for the positive electrode active material layer 1b may be any electron-conductive material which does not cause any chemical change at the charge/discharge potential of the positive electrode 1. For example, any of conductive fibers such as graphite materials, carbon black materials, carbon fibers, metal fibers and the like; metal powders, conductive whiskers, conductive metal oxides; organic conductive materials and the like may be used independently or as a mixture of two or more. The amount of the conductor is not specifically limited, but is preferably 1 to 50% by volume, and especially preferably 1 to 30% by volume, with respect to the positive electrode material.

The binder usable for the positive electrode active material layer 1b may be a thermoplastic resin or a thermosetting resin. Preferable examples of the binder include polyolefin resins such as polyethylene, polypropylene and the like; fluorine-based resins such as polytetrafluoroethylene (PTFE), poly (vinylidene fluoride) (PVDF), hexafluoropropylene (HFP) and the like; copolymeric resins thereof; and polyacrylic acids and copolymeric resins thereof.

In addition to the conductor and the binder, various other additives including a filler, a dispersant, an ion conductor, a pressure increasing agent, and the like may be used. A filler may be any fibrous material which does not cause any chemical change in the lithium ion secondary battery.

The material of the positive electrode current collector 1a may be any electron conductor which does not cause any chemical change at the charge/discharge potential of the positive electrode 1. Examples of the usable material include stainless steel, aluminum, titanium, carbon, conductive resins, and the like. The surface of the positive electrode current collector 1a is preferably surface-treated to have concaves and convexes. The form of the positive electrode current collector 1a may be either foil, film, sheet, net, punched, lath, porous, foamed, fibrous, molded nonwoven cloth or the like. The thickness of the positive electrode current collector 1a is not specifically limited, but is generally 1 to 500 µm.

The material of the negative electrode active material layer 2b may be any of carbon materials such as various types of natural graphite, various types of artificial graphite, graphitizing carbon, non-graphitizing carbon and the like, or mixtures thereof; lithium metal; composite materials containing silicon or tin capable of reversibly occluding/releasing lithium; or various alloy materials. It is preferable to use, for example, at least one selected from the group consisting of a single body of silicon, a silicon alloy, a compound containing silicon and oxygen, a compound containing silicon and nitrogen, a single body of tin, a tin alloy, a compound containing tin and oxygen, and a compound containing tin and nitrogen. In addition, an oxide material capable of reversibly occluding/releasing lithium, such as lithium titanate or the like, or a lithium-containing composite nitride is usable.

A material usable for the negative electrode current collector 2a may be, for example, copper foil, nickel foil, stainless steel foil or the like.

The nonaqueous electrolytic solution 15 in this embodiment has a high oxidation resistance and a high ion conductivity as described in Embodiment 2. Therefore, the lithium ion secondary battery in this embodiment has a superb high-rate charge/discharge characteristic and can be charged at a high voltage exceeding 4.3V. The lithium ion secondary battery in this embodiment suppresses the actuation of a safety mechanism (CID), which would otherwise be caused by the oxidation and decomposition of the nonaqueous solvent, and also suppresses the battery expansion.

In this embodiment, the sheet-type lithium ion secondary battery is described as an example, but the lithium ion secondary battery in this embodiment may have any other shape. For example, the lithium ion secondary battery in this embodiment may have a cylindrical or polygonal shape, or may be sufficiently large to be used for an electric vehicle or the like.

The lithium ion secondary battery in this embodiment is preferably usable for mobile information terminals, mobile electronic devices, home-use compact power storage devices, motorcycles, electric vehicles, hybrid electric vehicles, and the like, as well as other devices.

Embodiment 4

Hereinafter, an electrical storage device in an embodiment according to the present invention will be described. The electrical storage device in this embodiment is an electric double layer capacitor.

Figure 2:
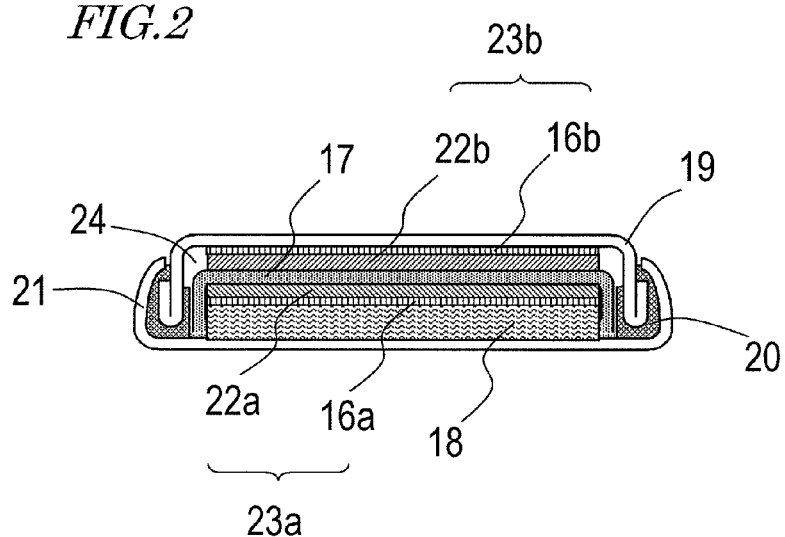
FIG. 2 is a cross-sectional view showing an electric double layer capacitor in an embodiment according to the present invention.

As shown in FIG. 2, the electric double layer capacitor includes disc-shaped electrodes 23a and 23b facing each other and a separator 17 located between the two electrodes 23a and 23b. The electrode 23a includes a current collector 16a and an electrode compound 22a provided on a surface of the current collector 16a. Similarly, the electrode 23b includes a current collector 16b and an electrode compound 22b provided on a surface of the current collector 16b. The current collectors 16a and 16b are formed of, for example, aluminum foil, and the electrode compounds 22a and 22b contains, for example, activated carbon.

An electrode unit including the electrodes 23a and 23b and the separator 17 is accommodated in a case 21 having a circular bottom surface. On the bottom surface of the case 21, a spacer 18 is located, and the electrode unit is placed on the spacer 18. The case 21 is opened at the top and is covered with a sealing plate 19. A gap between the case 21 and the sealing plate 19 is filled with a gasket 20.

The inside of the case 21 and the sealing plate 19 is impregnated with a prescribed amount of nonaqueous electrolytic solution 24. The nonaqueous electrolytic solution 24 includes a nonaqueous solvent containing propylene carbonate (PC) (commercially available battery grade), ethylmethyl carbonate (EMC) (commercially available battery grade), and trifluoromethylcyclohexane (TFMCH) mixed at a weight ratio of 62:25:13 and $(C_2H_5)_4NBF_4$ dissolved in the nonaqueous solvent at a concentration of 1 mol/L. Propylene carbonate is a compound having a relative dielectric constant of 25 or higher, ethylmethyl carbonate is a chain carbonate, and trifluoromethylcyclohexane is fluorine-containing cyclic saturated hydrocarbon.

The nonaqueous electrolytic solution 24 in this embodiment has a high oxidation resistance and a high ion conductivity as described in Embodiment 2. Therefore, the electric double layer capacitor in this embodiment has a superb high-rate charge/discharge characteristic and can be charged at a high voltage exceeding 4.3V. The electric double layer capacitor in this embodiment suppresses the actuation of a safety mechanism (CID), which would otherwise be caused by the oxidation and decomposition of the nonaqueous solvent, and also suppresses the battery expansion.

The electric double layer capacitor in this embodiment is coin-shaped, but may have any other shape, for example, a cylindrical or polygonal shape.

EXAMPLES

1. Evaluation on the Dipole Moment and the Highest Occupied Molecular Orbit (HOMO) Energy of the Fluorine-Containing Cyclic Saturated Hydrocarbon Represented by General Formula (1)

The dipole moment and the highest occupied molecular orbit energy of the fluorine-containing cyclic saturated hydrocarbon represented by general formula (1) were calculated. For comparison, the dipole moment and the highest occupied molecular orbit energy of methylcyclohexane (MCH) containing no fluorine were also calculated.

The dipole moment is an index representing the magnitude of intramolecular polarization, and is related to the compatibility with a polar solvent expressed by the present invention. The highest occupied molecular orbit energy is an index representing the energy required to pull out one electron from a molecule, and is related to the oxidation resistance performance of the solvent.

The dipole moment and the highest occupied molecular orbit energy were calculated using a quantum-chemical calculation method. Specifically, the calculation was performed using commercially available first principle molecular orbit calculation software, by means of the density functional method (B3LYP) as the calculation method and 6-31G(d) as the basis function. The optimization of the energy value was performed by self consistent field calculation.

Figure 3:
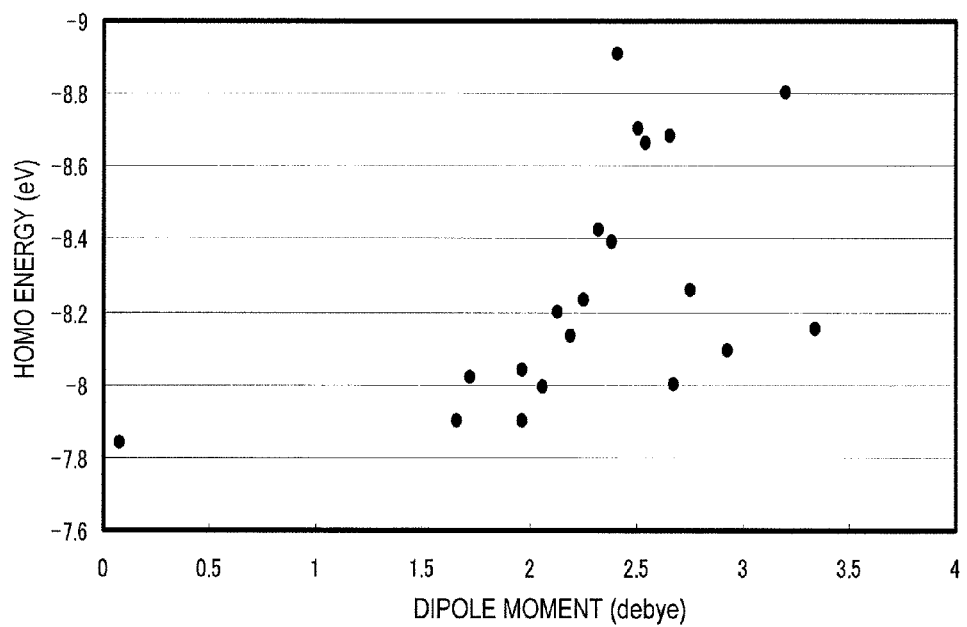
FIG. 3 shows the dipole moment and the highest occupied molecular orbit (HOMO) energy of each type of fluorine-containing cyclic saturated hydrocarbon contained in a nonaqueous solvent for an electrical storage device according to the present invention.

The calculation results are shown in Table 3. FIG. 3 shows the results of plotting the dipole moment and the highest occupied molecular orbit energy of each type of fluorine-containing cyclic saturated hydrocarbon.

TABLE 3

| | Compound | Formula | * | ** |
|---|---|---|---|---|
| Ex. | Fluoromethyl cyclohexane | $CH_2F$ | 1.72 | −8.02 |
| Ex. | Difluoromethyl cyclohexane | $CHF_2$ | 2.14 | −8.20 |
| Ex. | Trifluoromethyl cyclohexane | $CF_3$ | 2.33 | −8.42 |
| Ex. | (1-fluoroethyl) cyclohexane | $CHFCH_3$ | 1.66 | −7.90 |
| Ex. | (2-fluoroethyl) cyclohexane | $CH_2CH_2F$ | 1.97 | −7.90 |
| Ex. | (1,1-difluoroethyl) cyclohexane | $CF_2CH_3$ | 1.97 | −8.04 |
| Ex. | (1,2-difluoroethyl) cyclohexane | $CHFCH_2F$ | 2.68 | −8.00 |
| Ex. | (2,2-difluoroethyl) cyclohexane | $CH_2CHF_2$ | 2.07 | −7.99 |

TABLE 3-continued

| | Compound | Formula | * | ** |
|---|---|---|---|---|
| Ex. | (1,1,2-trifluoroethyl) cyclohexame | $CF_2CH_2F$ | 3.34 | −8.15 |
| Ex. | (1,2,2-trifluoroethyl) cyclohexame | $CHFCHF_2$ | 2.93 | −8.09 |
| Ex. | (2,2,2-trifluoroethyl) cyclohexane | $CH_2CF_3$ | 2.2 | −8.13 |
| Ex. | (1,1,2,2-tetrafluoroethyl) cyclohexane | $CF_2CHF_2$ | 2.76 | −8.26 |
| Ex. | (1,2,2,2-tetrafluoroethyl) cyclohexane | $CHFCF_3$ | 2.26 | −8.23 |
| Ex. | (pentafluoroethyl) cyclohexane | $CF_2CF_3$ | 2.39 | −8.39 |
| Ex. | 1,1-bis(trifluoromethyl) cyclohexane | $CF_3, CF_3$ | 2.51 | −8.70 |
| Ex. | 1,2-bis(trifluoromethyl) cyclohexane | $CF_3, CF_3$ | 3.2 | −8.80 |
| Ex. | 1,3-bis(trifluoromethyl) cyclohexane | $CF_3, CF_3$ | 2.42 | −8.91 |

TABLE 3-continued

| | Compound | Formula | * | ** |
|---|---|---|---|---|
| Ex. | 1-(pentafluoroethyl)-1-(trifluoromethyl)cyclohexane | $CF_2CF_3$, $CF_3$ 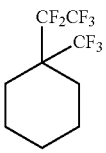 | 2.55 | −8.66 |
| Ex. | 1,1-bis(pentafluoroethyl)cyclohexane | $CF_2CF_3$, $CF_2CF_3$ 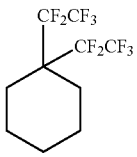 | 2.66 | −8.68 |
| *** | Methylcyclohexane | 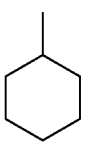 | 0.08 | −7.84 |

\* Dipole moment (debye)
\*\* Highest occupied molecular orbit energy (eV)
\*\*\* Comparative Ex.

All the types of the fluorine-containing cyclic saturated hydrocarbon represented by general formula (1) had a dipole moment larger than about 1.6 debye. The fluorine-containing cyclic saturated hydrocarbon having the smallest dipole moment was (1-fluoroethyl)cyclohexane (1FECH), which had a dipole moment of 1.66. By contrast, methylcyclohexane had a dipole moment of 0.08 debye.

All the types of the fluorine-containing cyclic saturated hydrocarbon represented by general formula (1) had a highest occupied molecular orbit energy smaller than that of methylcyclohexane. Oxidation reaction is a reaction of pulling out electrons from a molecule. As the highest occupied molecular orbit energy is smaller (larger in a negative direction), a larger energy is required to pull out electrons, which means that the oxidation resistance is higher. Accordingly, it is understood that all the types of fluorine-containing cyclic saturated hydrocarbon according to the present invention obtained by introducing, as a substituent, an alkyl group having a fluorine atom into a cyclohexane cyclic structure have a high oxidation resistance.

2. Solubility of the Support Electrolyte Salt in the Nonaqueous Solvent

Preparation of the Nonaqueous Solvent

Example 1

As shown in Table 4, ethylene carbonate (EC) as a compound having a relative dielectric constant of 25 or higher, ethylmethyl carbonate (EMC) as a chain carbonate, and trifluoromethylcyclohexane (TFMCH) as fluorine-containing cyclic saturated hydrocarbon were mixed at different weight ratios to prepare a plurality of types of nonaqueous solvents. $LiPF_6$ was added to each of the nonaqueous solvents at a concentration of 0.6, 1, 1.5 or 2 mol/L and mixed well to obtain electrolytic solutions A, B, C, D, E, F, G, H, I, J, K, and L.

TABLE 4

| Electrolytic solution | Support electrolyte salt $LiPF_6$ (mol/l) | Compound having relative dielectric constant of 25 or higher EC (vol %) | Chain carbonate EMC (vol %) | Fluorine-containing cyclic saturated hydrocarbon TFMCH (vol %) | Mixed state |
|---|---|---|---|---|---|
| A | 1 | 80 | 17 | 3 | Uniform |
| B | 1 | 75 | 20 | 5 | Uniform |
| C | 1 | 60 | 30 | 10 | Uniform |
| D | 1 | 41 | 45 | 14 | Uniform |
| E | 1 | 25 | 55 | 20 | Uniform |
| F | 1 | 13 | 57 | 30 | Uniform |
| G | 1 | 5 | 55 | 40 | Uniform |
| H | 1 | 40 | 50 | 10 | Uniform |
| I | 1 | 20 | 70 | 10 | Uniform |
| J | 0.6 | 43 | 42 | 15 | Uniform |
| K | 1.5 | 15 | 70 | 15 | Uniform |
| L | 2 | 15 | 70 | 15 | Uniform |

Example 2

As compounds having a relative dielectric constant of 25 or higher, ethylene carbonate (EC), propylene carbonate (PC), sulfolane (SLF), and 3-methyl sulfolane (3MeSLF) were prepared. As chain carbonates, dimethyl carbonate (DMC), ethylmethyl carbonate (EMC), diethyl carbonate (DEC), methylpropyl carbonate (MPC), methylisopropyl carbonate (MiPC), dipropyl carbonate (DPC), and dibutyl carbonate (DBC) were prepared. As fluorine-containing cyclic saturated hydrocarbon, trifluoromethylcyclohexane (TFMCH), 1,2-bis(trifluoromethyl)cyclohexane (12BTFMCH), and (2-fluoroethyl)cyclohexane (2FECH) were prepared. These were mixed at different weight ratios as shown in Tables 5 through to prepare a plurality of types of nonaqueous solvents. $LiPF_6$ was added to each of these nonaqueous solvents at a concentration of 1 mol/L and mixed well to obtain electrolytic solutions M, N, O, P, Q, R, S, T, U, V, and W.

Comparative Example 1

As shown in Table 9, propylene carbonate (PC) and trifluoromethylcyclohexane (TFMCH) were mixed at a weight ratio of 75:25 to prepare a nonaqueous solvent. $LiPF_6$ was added to this nonaqueous solvent at a concentration of 1 mol/L and mixed well to obtain an electrolytic solution X. $LiPF_6$ was added to this nonaqueous solvent at a concentration of 0.2 mol/L and mixed well to obtain an electrolytic solution Y.

TABLE 5

| Electrolytic solution | Support electrolyte salt LiPF$_6$ (mol/l) | Compound having relative dielectric constant of 25 or higher | | | Chain carbonate | | Fluorine-containing cyclic saturated hydrocarbon | Mixed state |
|---|---|---|---|---|---|---|---|---|
| | | EC (vol %) | PC (vol %) | SLF (vol %) | EMC (vol %) | DEC (vol %) | TFMCH (vol %) | |
| M | 1 | 30 | — | — | — | 55 | 15 | Uniform |
| N | 1 | — | 53 | — | 30 | — | 17 | Uniform |
| O | 1 | — | — | 37 | 50 | — | 13 | Uniform |

TABLE 6

| Electrolytic solution | Support electrolyte salt LiPF$_6$ (mol/l) | Compound having relative dielectric constant of 25 or higher | Chain carbonate | | | Fluorine-containing cyclic saturated hydrocarbon | Mixed state |
|---|---|---|---|---|---|---|---|
| | | EC (vol %) | DMC (vol %) | MiPC (vol %) | MPC (vol %) | TFMCH (vol %) | |
| P | 1 | 29 | 57 | — | — | 14 | Uniform |
| Q | 1 | 29 | — | 57 | — | 14 | Uniform |
| R | 1 | 29 | — | — | 57 | 14 | Uniform |

TABLE 7

| Electrolytic solution | Support electrolyte salt LiPF$_6$ (mol/l) | Compound having relative dielectric constant of 25 or higher | | Chain carbonate | | | Fluorine-containing cyclic saturated hydrocarbon | Mixed state |
|---|---|---|---|---|---|---|---|---|
| | | PC (vol %) | 3MeSLF (vol %) | EMC (vol %) | DPC (vol %) | DBC (vol %) | TFMCH (vol %) | |
| S | 1 | 40 | — | 40 | — | — | 20 | Uniform |
| T | 1 | 40 | — | — | — | 40 | 20 | Uniform |
| U | 1 | — | 29 | 57 | — | — | 14 | Uniform |

TABLE 8

| Electrolytic solution | Support electrolyte salt LiPF$_6$ (mol/l) | Compound having relative dielectric constant of 25 or higher PC (vol %) | Chain carbonate EMC (vol %) | Fluorine-containing cyclic saturated hydrocarbon | | Mixed state |
|---|---|---|---|---|---|---|
| | | | | 12BTFMCH (vol %) | 2FECH (vol %) | |
| V | 1 | 40 | 40 | 20 | — | Uniform |
| W | 1 | 40 | 40 | — | 20 | Uniform |

TABLE 9

| Electrolytic solution | Support electrolyte salt LiPF$_6$ (mol/l) | Compound having relative dielectric constant of 25 or higher PC (vol%) | Chain carbonate EMC (vol%) | Fluorine-containing cyclic saturated hydrocarbon TFMCH (vol%) | Mixed State |
|---|---|---|---|---|---|
| X | 1 | 75 | 0 | 25 | Non-uniform |
| Y | 0.2 | 75 | 0 | 25 | Uniform |

The solvents used were prepared as follows.

[Methylpropyl carbonate]
[Methylisopropyl carbonate]
[Dipropyl carbonate]
[Dibutyl carbonate]

Commercially available products of methylpropyl carbonate (MPC) [CAS RN: 56525-42-9], methylisopropyl carbonate (MiPC) [CAS RN: 51729-83-0], dipropyl carbonate (DPC) [CAS RN: 623-96-1], and dibutyl carbonate (DBC) [CAS RN: 542-52-9] were used and purified by a rotary band precision fractionation device (produced by Oka Kogyo Kabushiki Kaisha). The purity of each obtained purified product, which was measured by gas chromatography (Shimadzu Corporation), was 99.5% or higher. Immediately before the preparation of the electrolytic solutions, each obtained product was dehydrated using a molecular sieve [4A] processed in vacuum at 200° C. for 12 hours. The post-dehydration amount of moisture of each product was 20 ppm or lower.

[Trifluoromethylcyclohexane]

A commercially available product of trifluoromethylcyclohexane (TFMCH) [CAS RN: 401-75-2] was used and purified by a rotary band precision fractionation device (produced by Oka Kogyo Kabushiki Kaisha). The purity of the obtained purified product, which was measured by gas chromatography (Shimadzu Corporation), was 99.5%.

[1.2-bis(trifluoromethyl)cyclohexane]

1.2-bis(trifluoromethyl)cyclohexane (12BTFMCH) was obtained by a synthesis method described below.

5 g of platinum oxide (produced by Aldrich) and 250 mL of trifluoroacetic acid (produced by Wako Pure Chemical Industries, Ltd.) were put into an oxidation-resistant autoclave having a Teflon inner tube, and the inside thereof was substituted with hydrogen. The resultant substance was stirred at room temperature for 1 hour in a hydrogen atmosphere of 0.2 Mpa. The autoclave was removed, and 25 g of 1,2-ditrifluoromethylbenzene (produced by Tokyo Chemical Industry Co., Ltd.) was added and stirred again at room temperature for 18 hours in a hydrogen atmosphere of 0.8MPa. After the stirring was finished, it was confirmed by a gas chromatography (GC) analysis that the peak of 1,2-ditrifluoromethylbenzene, which was a starting material, disappeared. After the trifluoroacetic acid solution only was removed from the resultant black suspension liquid by decantation, the residue was washed with trifluoroacetic acid. 300 ml of distilled water was added to a mixture of the trifluoroacetic acid and the residue, and was separated into two layers by a separating funnel. The lower layer containing the target substance was taken out. 100 mL of dichloromethane was added to the lower layer, and then was washed with sodium bicarbonate water. The layer of dichloromethane solution was taken out by a separating funnel, and dried with anhydrous sodium sulfate. After the anhydrous sodium sulfate was removed by filtration, the resultant substance was distilled by a Liebig condenser at a bath temperature of 60° C. to remove dichloromethane. The residue was purified 4 times by reduced pressure distillation using a rectifying tower including a Liebig condenser having 3-stage inner tubes under the conditions of the bath temperature of 100 to 176° C., the vapor temperature of 90 to 145° C., and the internal pressure of 280 to 420 mmHg. As a result, 11.8 g of colorless liquid was obtained.

By the measurement of $^1$H-NMR spectrum (CDCl$_3$), a multiplet corresponding to two hydrogen atoms having a peak at 1.437, 1.459, 1.470, 1.481, 1.494, 1.515, and 1.541 ppm, a multiplet corresponding to four hydrogen atoms having a peak at 1.630, 1.641, 1.652, 1.685, 1.726, 1.742, 1.754, and 1.778 ppm, a multiplet corresponding to two hydrogen atoms having a peak at 1.977, 1.996, 2.013, 2.024, and 2.044 ppm, and a multiplet corresponding to two hydrogen atoms having a peak at 2.493, 2.518, 2.528, 2.539, 2.543, 2.553, 2.564 and 2.589 ppm were observed. Thus, it was found that the number of the hydrogen atoms of this compound was 10. By the measurement of $^{19}$F-NMR spectrum (CDCl$_3$), a singlet corresponding to six fluorine atoms having a peak at 66.191 ppm was observed. From the above-described results, it was found that the colorless liquid was 1,2-bis(trifluoromethyl)cyclohexane. The purity, which was measured by gas chromatography (Shimadzu Corporation), was 99.0%.

[(2-fluoroethyl)cyclohexane]

(2-fluoroethyl)cyclohexane (2FECH) was obtained by a synthesis method described below.

100 g of 2-cyclohexylethanol (produced by Tokyo Chemical Industry Co., Ltd.), 162 mL of triethylamine (produced by Tokyo Chemical Industry Co., Ltd.), and 1 L of dehydrated dichloromethane (produced by Kanto Chemical Co., Inc.) were put into a 2 L reactor and ice-cooled to 5° C. To the resultant mixture solution, 72.4 mL of methanesulfonylchloride (produced by Tokyo Chemical Industry Co., Ltd.) was slowly added and stirred at 5° C. for 1 hour. Then, it was confirmed by thin layer chromatography (TLC) that the spot of the starting material disappeared and a new spot was generated. After 50 mL of distilled water was added to this solution, the resultant substance was kept still and separated into two layers. The organic layer and the water layer were taken out by a separating funnel. 30 mL of dichloromethane (produced by Kanto Chemical Co., Inc.) was added to the water layer. The resultant substance was kept still and separated into two layers. The dichloromethane layer was taken out by a separating funnel. The dichloromethane layer was mixed with the organic layer separated from the water layer and taken out above, and the resultant mixture was washed with 300 mL of distilled water. Then, the organic layer was taken out by a separating funnel. The organic layer was further washed with 300 mL of saturated saline solution. Then, the organic layer was taken out by a separating funnel. To the obtained organic solution, anhydrous magnesium sulfate was added and dried. Then, anhydrous magnesium sulfate was removed by filtration, and the resultant substance was concentrated. As a result, 165 g of pale orange liquid was obtained. This liquid was dried in a high vacuum state. As a result, 157 g of 2-cyclohexylethyl methanesulfonate, which is a mesylated form of 2-cyclohexylethanol, was obtained. 2-cyclohexylethanol was the pale orange liquid.

120 g of the obtained 2-cyclohexylethyl methanesulfonate was put into a 1 L reactor. 367 g of tetrabutylammonium fluoride (produced by Wako Pure Chemical Industries, Ltd.) and 180 g of acetonitrile (produced by Wako Pure Chemical Industries, Ltd.) were added thereto, and stirred in an environment of 50° C. for 24 hours. A part of the resultant solution was taken out and analyzed by gas chromatography (Shimadzu Corporation). It was confirmed that the peak of 2-cyclohexylethyl methanesulfonate, which was a starting material, completely disappeared. 1 L of distilled water was added to this solution, and the organic layer was extracted 3 times with 300 ml of pentane (produced by Kanto Chemical Co., Inc.). The obtained organic layer was washed with 800 mL of distilled water. The organic layer was taken out by a separating funnel. After being washed again with the above-mentioned distilled water, the organic layer was washed with 800 mL of saturated saline solution. The organic layer was taken out by a separating funnel. To the obtained organic solution, anhydrous magnesium sulfate was added and dried. The anhydrous magnesium sulfate was removed by filtration. The organic solution deprived of the anhydrous magnesium sulfate was subjected to reduced pressure distillation in an environment of 30° C. to remove the pentane as the solvent. The residue was purified by reduced pressure distillation using a rectifying tower including a Liebig condenser having 3-stage inner tubes under the conditions of the bath temperature of 72° C., the vapor temperature of 62° C., and the internal pressure of 32 mmHg. As a result, 39.5 g of colorless liquid was obtained.

By the measurement of $^1$H-NMR spectrum (CDCl$_3$), a multiplet corresponding to two hydrogen atoms having a peak at 0.886, 0.897, 0.921, 0.948, 0.979, and 0.987 ppm, a multiplet corresponding to three hydrogen atoms having a peak at 1.130, 1.138, 1.145, 1.162, 1.168, 1.176, 1.191, 1.197, 1.204, 1.211, 1.234, 1.242, 1.259, 1.265, and 1.297 ppm, a multiplet corresponding to one hydrogen atom having a peak at 1.414, 1.424, 1.433, 1.441, 1.451, 1.459, and 1.467 ppm, a multiplet corresponding to seven hydrogen atoms having a peak at 1.531, 1.547, 1.551, 1.562, 1.579, 1.595, 1.611, 1.627, 1.639, 1.643, 1.655, 1.661, 1.680, 1.686, 1.695, 1.701, 1.716, 1.720, 1.745, 1.749, and 1.753, and two peaks corresponding to two hydrogen atoms formed of triplet peaks at 4.415, 4.430, and 4.446 ppm and triplet peaks at 4.534, 4.549, and 4.565 ppm were observed. Thus, it was found that the number of the hydrogen atoms of this compound was 15. From the triplet peaks at 4.415, 4.430, and 4.446 ppm and the triplet peaks at 4.534, 4.549, and 4.565 ppm, it was found that the number of hydrogen atoms on carbon to which the fluorine atom was bonded was 2, and that the number of hydrogen atoms, on carbon, which are bonded to carbon bonded to the fluorine atom was 2. By the measurement of $^{19}$F-NMR spectrum (CDCl$_3$), a singlet corresponding to one fluorine atom having a peak at −218.470 ppm was observed. From the above-described results, it was found that the colorless liquid was (2-fluoroethyl)cyclohexane.

The purity, which was measured by gas chromatography (Shimadzu Corporation), was 99.2%.

Commercially available battery grade products of ethylene carbonate, propylene carbonate, sulfolane, 3-methyl sulfolane, dimethyl carbonate, ethylmethyl carbonate, and diethyl carbonate were used.

<Method and Results of Evaluation>

The state of each of the electrolytic solutions A through Y in Examples 1 and 2 and Comparative Example 1 was visually observed. The composition of the nonaqueous solvent, the amount of LiPF$_6$ and the evaluation results are shown in Tables 4 through 9.

As shown in Table 4, the electrolytic solutions A, B, C, D, E, F, G, H, I, J, K, and L produced using ethylene carbonate (EC) as the compound having a relative dielectric constant of 25 or higher, ethylmethyl carbonate (EMC) as the chain carbonate, and trifluoromethylcyclohexane (TFMCH) as fluorine-containing cycle saturated hydrocarbon can dissolve LiPF$_6$, which is a support electrolyte salt, at a concentration of 0.6 ml/L or higher. Uniform nonaqueous electrolytic solutions were obtained.

As shown in Tables 5 through 8, also in the case where propylene carbonate (PC), sulfolane (SLF), or 3-methyl sulfolane (3MeSLF) is used as the compound having a relative dielectric constant of 25 or higher, dimethyl carbonate (DMC), ethylmethyl carbonate (EMC), methylpropyl carbonate (MPC), methylisopropyl carbonate (MiPC), dipropyl carbonate (DPC), or dibutyl carbonate (DBC) is used as the chain carbonate, and trifluoromethylcyclohexane (TFMCH), 1,2-bis(trifluoromethyl)cyclohexane (12BTFMCH), or (2-fluoroethyl)cyclohexane (2FECH) is used as the fluorine-containing cyclic saturated hydrocarbon, LiPF$_6$ as a support electrolyte salt can be dissolved at a high concentration of the electrolytic solution in a similar manner to the above.

However, as shown in Table 9, in the case of a nonaqueous solvent containing no chain carbonate and containing only a solvent having a high dielectric constant solvent and fluorine-containing cyclic saturated hydrocarbon, a uniform nonaqueous electrolytic solution (Y) was obtained when the concentration of the support electrolyte salt was 0.2 mol/L, but a uniform nonaqueous electrolytic solution (X) was not obtained when the concentration of the support electrolyte salt was 1 mol/L.

3. Conductivity of the Nonaqueous Electrolytic Solutions

Hereinafter, the results of measurement of the conductivity of the electrolytic solutions created in Examples 1 and 2 and Comparative Example 1.

<Measurement of the Conductivity>

Among the electrolytic solutions in Examples 1 and 2 and Comparative Example 1, the conductivity of each of the uniformly mixed electrolytic solutions D, M, N, O, P, Q, R, S, T, U, V and W, and the electrolytic solution Y produced for comparison, was measured using a conductive meter (produced by DKK-Toa Corporation).

Table 10 shows the measured conductivity values of the electrolytic solutions.

TABLE 10

| Electrolytic solution | LiPF$_6$ (mol/l) | Conductivity (mS/cm) |
|---|---|---|
| D | 1 | 7.0 |
| M | 1 | 5.4 |
| N | 1 | 4.7 |
| O | 1 | 4.0 |
| P | 1 | 8.7 |
| Q | 1 | 4.5 |
| R | 1 | 5.0 |
| S | 1 | 3.3 |
| T | 1 | 3.0 |
| U | 1 | 3.3 |
| V | 1 | 5.8 |
| W | 1 | 5.9 |
| Y | 0.2 | 2.7 |

As shown in Table 10, the electrolytic solutions D, M, N, O, P, Q, R, S, T, U, V, and W has a conductivity of 3.0 mS/cm or greater, whereas the electrolytic solution Y has a conductivity of only 2.70 mS/cm. The reason for this is that the support electrolyte salt is not dissolved at a high concentration in the electrolytic solution Y.

4. Creation and Characteristic Evaluation of the Lithium Ion Secondary Batteries Hereinafter, creation and characteristic evaluation of lithium ion secondary batteries will be described.

<Preparation of the Electrolytic Solution>

Example 3

In Example 3, lithium ion secondary batteries were created using the electrolytic solutions D, M, N, O, P, Q, R, S, T, U, V, and W in Examples 1 and 2.

Comparative Example 2

In Comparative Example 2, a lithium ion secondary battery was created using the electrolytic solution Y in Comparative Example 1.

The lithium ion secondary batteries were created as follows.

<Creation of the Positive Electrode>

First, as the positive electrode active material, $LiCoO_2$ (average particle diameter: 10 μm; specific surface area by the BET method: 0.38 m$^2$/g) was prepared. To 100 parts by weight of the active material, 3 parts by weight of acetylene black as a conductor, 4 parts by weight of poly(vinylidene fluoride) as a binder, and an appropriate amount of N-methyl-2-pyrrolidone were added, stirred and mixed to obtain a slurry-like positive electrode compound. The poly(vinylidene fluoride) was used in the state of being dissolved in N-methyl-2-pyrrolidone.

Figure 4:
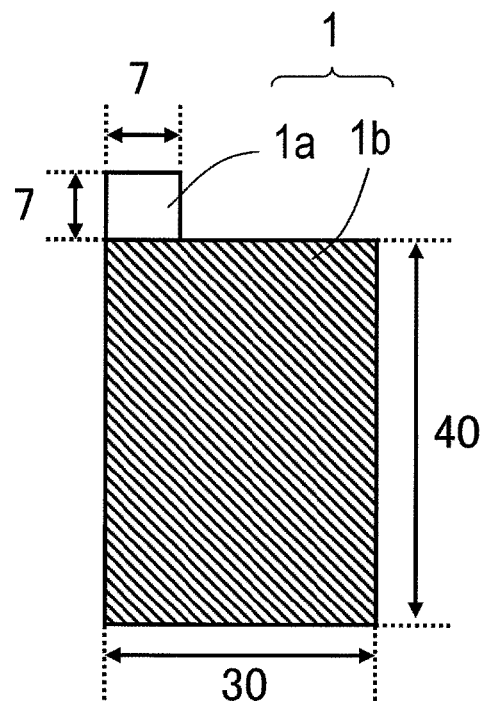
FIG. 4 shows the size of a positive electrode 1 created in an example.

Next, as shown in FIG. 4, the slurry-like positive electrode compound 1b was applied on one surface of the current collector 1a formed of aluminum foil having a thickness of 20 μm. The applied layer was dried and extended by a roller.

$LiCoO_2$ used as the positive electrode active material was prepared as follows.

While a saturated aqueous solution of cobalt sulfate was stirred at a low rate, an alkaline solution having sodium hydroxide dissolved therein was dropped thereto to obtain a precipitate of $Co(OH)_2$. This precipitate was filtrated, washed with water, and heated to 80° C. in the air to be dried. The average particle diameter of the obtained hydroxide was about 10 μm.

Next, the obtained hydroxide was heat-treated at 380° C. for 10 hours in the air to obtain $Co_3O_4$, which is an oxide. It was confirmed by powder X ray analysis that the obtained oxide had a single phase.

In addition, the obtained oxide was mixed with powder of lithium carbonate such that the ratio of the Co molarity and the Li molarity would be 1.00:1.00. The resultant substance was heat-treated at 1000° C. for 10 hours in the dried air. Thus, the target $LiCoO_2$ was obtained. It was confirmed by a powder X ray analyzer (produced by Rigaku) that the obtained $LiCoO_2$ had a single-phase hexagonal layer structure. After pulverization and classification, the obtained $LiCoO_2$ was observed with a scanning electron microscope (produced by Hitachi High-Technologies Corporation) to confirm that the particle diameter was about 10 to 15 μm. The average particle diameter was obtained by a scattering-type particle size distribution meter (produced by HORIBA).

The obtained electrode plate was punched out into the size shown in FIG. 4, and the positive electrode compound 1b was delaminated from a tab, which was a lead attaching section. Thus, the positive electrode 1 was obtained. The positive electrode current collector 1a coated with the positive electrode compound 1b has a rectangular shape of 30 mm×40 mm.

<Creation of the Negative Electrode>

Figure 5:
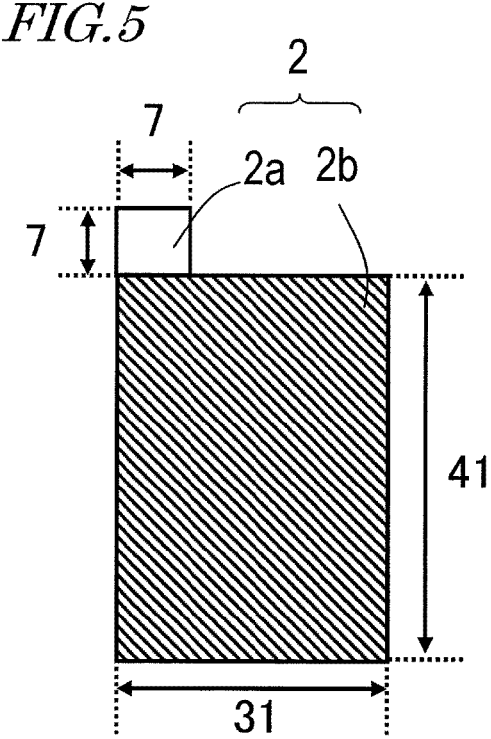
FIG. 5 shows the size of a negative electrode 2 created in an example.

A stainless steel (SUS304) mesh was punched out into the size shown in FIG. 5 to form a negative electrode current collector 2a. The negative electrode current collector 2a includes an electrode section having a rectangular shape of 31 mm×41 mm and a lead attaching section having a square shape of 7 mm×7 mm. On the electrode section of the negative electrode current collector 2a, a metal lithium layer 2b having a thickness of 150 μm was pressure-contacted. Thus, the negative electrode 2 was obtained.

<Assembly>

The obtained positive electrode 1 and negative electrode 2 were stacked with the separator 3 interposed therebetween to create the electrode unit 13 as shown in FIG. 1(c). As the separator, a polystyrene microporous sheet having a thickness of 20 μm was used.

Next, as shown in FIG. 1(a), the positive electrode lead 11 formed of aluminum was welded to the positive electrode 1 of the electrode unit 13, and the negative electrode lead 12 formed of nickel was welded to the negative electrode 2. Then, the electrode unit 13 was put into the battery case 14 opened on three sides and formed of an aluminum laminate film having a thickness of 0.12 mm. The electrode unit 13 was fixed to the inside of the battery case 14 with a tape formed of PP. Openings including an opening through which the positive electrode lead 11 and the negative electrode lead 12 extended outside were thermally welded, and one opening was left opened without being welded. Thus, the battery case 14 was formed like a bag. Each of the electrolytic solutions D, M, N, O, and Q was injected as the electrolytic solution 15 through the opening not thermally welded. After the battery case 14 was treated with pressure reduction and deaeration, the opening was thermally welded in a reduced pressure state to seal the inside of the battery. From the electrolytic solutions D, M, N, O, P, Q, R, S, T, U, V, W, and Y, batteries d, m, n, o, p, q, r, s, t, u, v, w, and y were obtained. Each battery had a thickness of 0.5 mm, a width of 50 mm and a height of 100 mm. The designed capacitance of the battery when being charged at 4.3V was 40 mAh.

<Evaluation on the High-Rate Discharge Characteristic>

The high-rate discharge characteristic was evaluated using the created batteries d, m, n, o, p, q, r, s, t, u, v, w, and y.

In an environment of 25° C., each battery was treated with constant current charge at a current value of 16 mA until the voltage became 4.3V, and then treated with constant voltage charge at 4.3V until the current value was attenuated to 4 mA. Then, the battery was treated with constant current discharge at a current value of 4 mA until the voltage became 3.0V. The discharge capacitance obtained at this point was set as the initial discharge capacitance. Next, the battery was treated with constant current charge at a current value of 16 mA until the voltage became 4.3V, and then treated with constant voltage charge at 4.3V until the current value was attenuated to 4 mA. Then, the battery was treated with constant current discharge at a current value of 16 mA until the voltage became 3.0V. The discharge capacitance obtained at this point was set as the high-rate discharge capacitance. The ratio of the high-rate discharge capacitance with respect to the initial discharge capacitance for each battery is set as the high-rate discharge characteristic (high-rate discharge characteristic=high-rate discharge capacitance/initial discharge capacitance) and the percentage thereof is shown in Table 11.

TABLE 11

|  | Battery | Initial discharge capacitance (mAh/g) | High-rate discharge characteristic (%) | Generated amount of $CO_2$ (ml) |
|---|---|---|---|---|
| Example 3 | d | 150.4 | 98.9 | 0.41 |
|  | m | 150.9 | 96.8 | 0.30 |
|  | n | 149.9 | 93.6 | — |

TABLE 11-continued

|  | Battery | Initial discharge capacitance (mAh/g) | High-rate discharge characteristic (%) | Generated amount of $CO_2$ (ml) |
|---|---|---|---|---|
|  | o | 132.2 | 67.1 | 0.26 |
|  | p | 156.0 | 98.9 | 0.49 |
|  | q | 153.9 | 94.6 | 0.48 |
|  | r | 153.5 | 98.8 | 0.41 |
|  | s | 153.0 | 91.1 | 0.30 |
|  | t | 149.0 | 75.4 | 0.20 |
|  | u | 134.8 | 86.3 | 0.26 |
|  | v | 148.5 | 98.0 | 0.36 |
|  | w | 148.3 | 96.3 | 0.48 |
| Comparative Example 2 | y | 90.2 | 21.8 | 0.51 |

<High Temperature Storage>

Using each of the batteries d, m, n, o, p, q, r, s, t, u, v, w, and y, a high temperature storage test was performed in a charged state.

In an environment of 25° C., each battery was treated with constant current charge at a current value of 2 mA until the voltage became 4.3V, and then treated with constant voltage charge at 4.3V until the current value was attenuated to 0.4 mA. Then, each of the batteries in the charged state was maintained in an environment of a constant temperature bath of 85° C. for 3 days. It is considered that if the solvent contained in the electrolytic solution is oxidized and decomposed during this period, $CO_2$ is generated. Then, each of the batteries was taken out from the constant temperature bath, and the generated gas was quantized and component analysis was performed by gas chromatography. Table 11 shows the generated amount of $CO_2$ calculated from the results.

As shown in Table 11, in the battery y in Comparative Example 2, the initial discharge capacitance is as small as 90.2 mAh/g, and the high-rate discharge characteristic also shows a significant capacitance reduction to 21.8%. By contrast, in the batteries d, m, n, o, p, q, r, s, t, u, v, and w in Example 3, the initial discharge capacitance is 130 mAh/g or greater, and the high-rate discharge characteristic is 60% or greater. As understood from this, use of an electrolytic solution according to the present invention can prevent the reduction of the high-rate discharge characteristic, which is one of the serious problems of the conventional electrolytic solution.

In the batteries d, m, n, o, p, q, r, s, t, u, v, and w, the generated amount of $CO_2$ gas while being stored at a high temperature is 0.5 ml or less as in the battery y in the comparative example. Owing to fluorine-containing cyclic saturated hydrocarbon contained, the oxidation of the electrolytic solution is suppressed. In the case where both of a cyclic carbonate and a chain carbonate are used, like in the case where only a cyclic carbonate is contained as carbonic acid ester, the effect of fluorine-containing cyclic saturated hydrocarbon is provided.

An electrolytic solution was produced by dissolving $LiPF_6$ at a concentration of 0.2 mol/L in a solvent containing propylene carbonate (PC) as a cyclic carbonate and dimethyl carbonate (DMC) as a chain carbonate at a volumetric ratio of 75:25 without using fluorine-containing cyclic saturated hydrocarbon. Using this electrolytic solution, battery evaluation was performed in a similar manner as above. The generated amount of $CO_2$ gas was 2.18 ml.

5. Creation and Evaluation of the Electric Double Layer Capacitor

Electric double layer capacitors were created, and the characteristics thereof were evaluated. Hereinafter, the results will be described. The electric double layer capacitors were created as follows.

<Preparation of the Electrolytic Solution>

Example 4

In Example 4, a mixture solvent was prepared by mixing propylene carbonate (PC), ethylmethyl carbonate (EMC), and trifluoromethylcyclohexane (TFMCH) at a weight ratio of 62:25:13. In this mixture solvent, $(C_2H_5)_4NBF_4$ was dissolved at a concentration of 1 mol/L. Thus, an electrolytic solution AA was obtained.

Comparative Example 3

In a comparative example, an electrolytic solution containing only propylene carbonate (PC) as the solvent was prepared. In this solvent, $(C_2H_5)_4NBF_4$ was dissolved at a concentration of 1 mol/L. Thus, an electrolytic solution AB was obtained.

<Creation of the Electrode>

The electrode was created using activated carbon powder (specific surface area: 1700 $m^2/g$; average particle diameter: 2 μm). 100 mg of activated carbon powder and 20 mg of acetylene black were mixed uniformly, and 20 mg of polyvinylpyrrolidone and 800 mg of methanol were added thereto, to obtain a slurry. This slurry-like electrode compound was applied on the current collector formed of aluminum foil and dried in vacuum. The weight of the electrode compound applied was 2.2 mg/$cm^2$ of the current collector. The obtained electrode plate was punched out into a disc having a diameter of 12.5 mm to form an electrode.

<Assembly>

Using the obtained disc-shaped electrode, a coin-type electric double layer capacitor as shown in FIG. 2 was assembled. First, the electrodes 22a and 22b were located so as to face each other while interposing the separator 17 formed of a polypropylene nonwoven cloth sheet punched out into a circle having a diameter of 15 mm. Thus, the electrode unit was formed. The electrode unit was put into a case 21. After the inside of the case 21 was impregnated with a prescribed amount of the electrolytic solution AAY or AB, the inside of the capacitor was sealed with a sealing plate 19 provided with a gasket 20. Thus, an electric double layer capacitor aa using the electrolytic solution AA and an electric double layer capacitor ab using the electrolytic solution AB were created.

<Evaluation by the Charge/Discharge Test>

Figure 6:
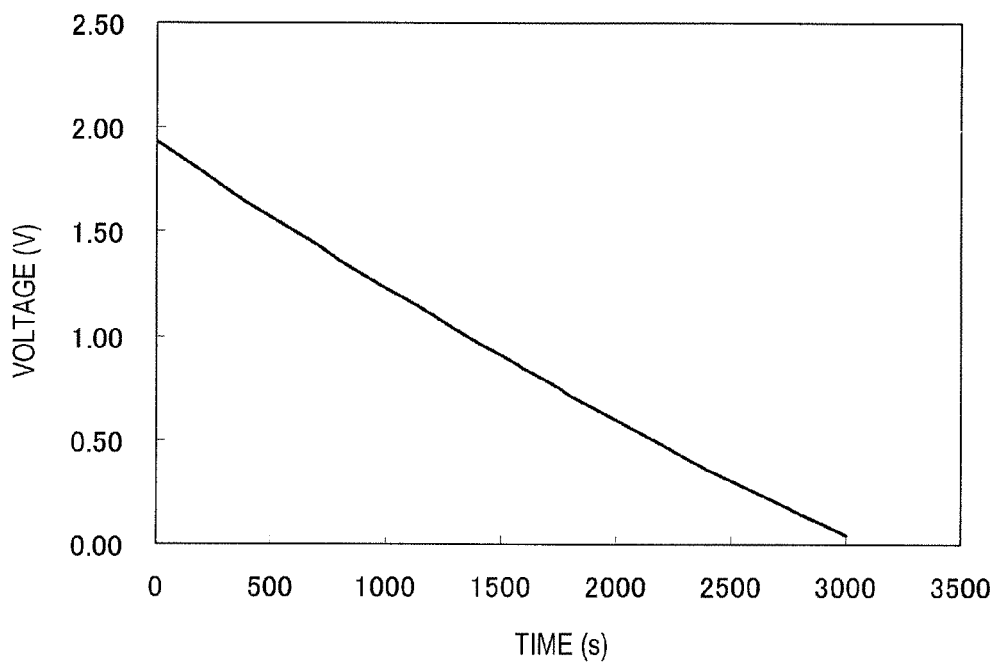
FIG. 6 is a graph showing the charge/discharge characteristic of an electric double layer capacitor Y in an example.

In an environment of 25° C., the created electric double layer capacitors aa and ab were subjected to a charge/discharge test at a constant current of 0.1 mA in the voltage range of 0 V to 2.0 v. FIG. 6 shows the results of the charge/discharge test conducted on the electric double layer capacitor aa, and FIG. 7 shows the results of the charge/discharge test conducted on the electric double layer capacitor ab.

Figure 7:
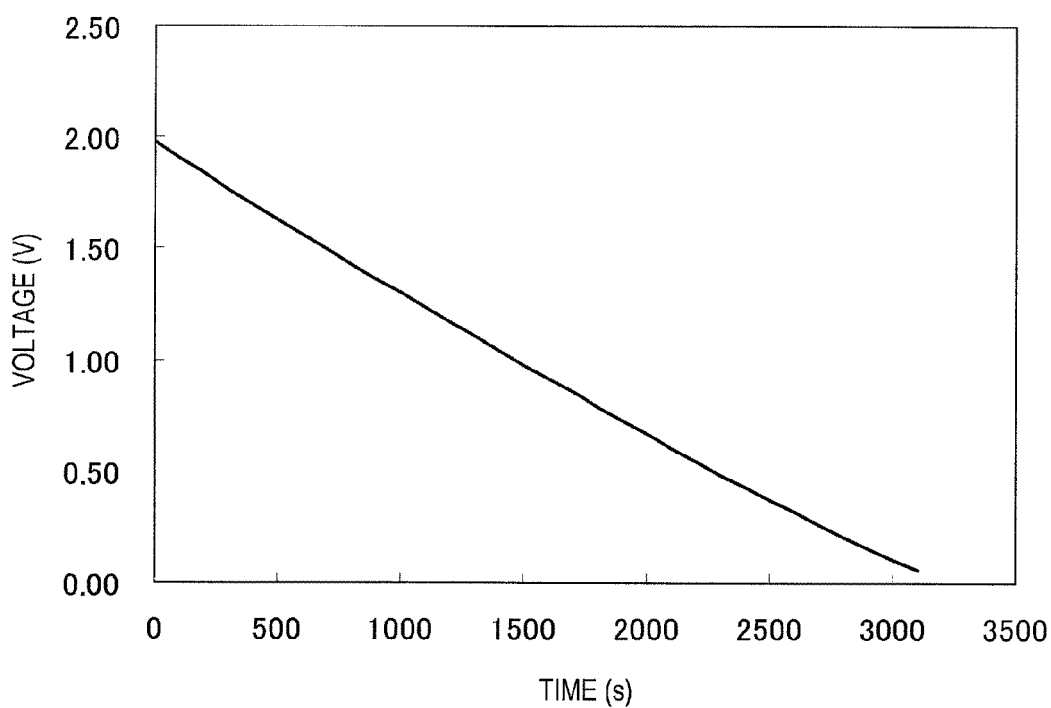
FIG. 7 is a graph showing the charge/discharge characteristic of an electric double layer capacitor Z in a comparative example.

As shown in FIG. 6 and FIG. 7, both in the case where the electric double layer capacitor aa in Example 4 is used and in the case where the electric double layer capacitor ab in Comparative Example 3 is used, substantially the same characteristic is exhibited.

It is understood that a nonaqueous electrolytic solvent and an electrolytic solution for an electrical storage device according to the present invention are preferably usable also in an electric double layer capacitor.

A main purpose of this example was to confirm that an electric double layer capacitor equivalent to or higher than the conventional electric double layer capacitor can be created using a nonaqueous electrolytic solvent and an electrolytic solution for an electrical storage device according to the present invention. Therefore, the created electric double layer capacitors were not subjected to a high temperature storage test. Nonetheless, in the electrolytic solution in Example 4, like in the electrolytic solutions in Example 3, the oxidation reaction is suppressed in a high potential state. Therefore, the electric double layer capacitor in Example 4 is highly reliable.

INDUSTRIAL APPLICABILITY

According to the present invention, a nonaqueous solvent and an electrolytic solution for an electrical storage device, which are superb in the oxidation resistance under a high voltage and have a high ion conductivity, are realized. Also, an electrical storage device exhibiting a high charge/discharge characteristic and a long and high-temperature reliability even if being charged at a high voltage can be realized.

The present invention is especially preferably usable for various storage devices which are charged at a high voltage.

DESCRIPTION OF THE REFERENCE NUMERALS

1 Positive electrode
1a Positive electrode current collector
1b Positive electrode compound
2 Negative electrode
2a Negative electrode current collector
2b Metal lithium
3, 17 Separator
11 Positive electrode lead
12 Negative electrode lead
13 Electrode unit
14 Battery case
15 Electrolytic solution
16a, 16b Aluminum current collector
18 Spacer
19 Sealing plate
20 Gasket
21 Case
22a, 22b Electrode compound
23a, 23b Electrode

The invention claimed is:

1. A nonaqueous solvent for an electrical storage device, comprising:
   fluorine-containing cyclic saturated hydrocarbon which is cyclohexane having one or two substituents R introduced into a cyclohexane ring, wherein R is represented by $C_nX_{2n+1}$, n is 1 or 2, at least one X is F, and other X are F or H;
   a compound having a relative dielectric constant of 25 or higher which is a cyclic carbonate or a cyclic sulfone; and
   a chain carbonate.

2. The nonaqueous solvent for an electrical storage device of claim 1, wherein the fluorine-containing cyclic saturated hydrocarbon is trifluoromethylcyclohexane.

3. The nonaqueous solvent for an electrical storage device of claim 1, wherein the fluorine-containing cyclic saturated hydrocarbon is 1,2-bis(trifluoromethyl)cyclohexane.

4. The nonaqueous solvent for an electrical storage device of claim 1, wherein the fluorine-containing cyclic saturated hydrocarbon is (2-fluoroethyl)cyclohexane.

5. A nonaqueous electrolytic solution for an electrical storage device, comprising:
   the nonaqueous solvent defined by claim 1; and
   a support electrolyte salt.

6. The nonaqueous electrolytic solution for an electrical storage device of claim 5, wherein the support electrolyte salt is a lithium salt.

7. The nonaqueous electrolytic solution for an electrical storage device of claim 5, wherein the support electrolyte salt is a quaternary ammonium salt.

8. A lithium ion secondary battery, comprising the nonaqueous electrolytic solution defined by claim 5.

9. An electric double layer capacitor, comprising the nonaqueous electrolytic solution defined by claim 5.

10. An electrical storage device, comprising the nonaqueous solvent defined by claim 1.

* * * * *